United States Patent
Cousseau et al.

(10) Patent No.: US 12,410,721 B2
(45) Date of Patent: Sep. 9, 2025

(54) TURBINE ROTOR AND PLATFORM FOR SUCH A ROTOR

(71) Applicant: Safran Aircraft Engines, Paris (FR)

(72) Inventors: Simon Jean-Marie Bernard Cousseau, Moissy-Cramayel (FR); Patrice Jean-Marc Rosset, Moissy-Cramayel (FR); Nicolas Xavier Trappier, Moissy-Cramayel (FR); Julian Nicolas Girardeau, Moissy-Cramayel (FR); Patrick Joseph Marie Girard, Moissy-Cramayel (FR); Baptiste Dorian Lawniczek, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/720,412

(22) PCT Filed: Dec. 14, 2022

(86) PCT No.: PCT/FR2022/052351
§ 371 (c)(1),
(2) Date: Jun. 14, 2024

(87) PCT Pub. No.: WO2023/111454
PCT Pub. Date: Jun. 22, 2023

(65) Prior Publication Data
US 2025/0043687 A1  Feb. 6, 2025

(30) Foreign Application Priority Data
Dec. 17, 2021 (FR) .................................. 2113806

(51) Int. Cl.
*F01D 5/32* (2006.01)
*F01D 5/30* (2006.01)
*F01D 11/00* (2006.01)

(52) U.S. Cl.
CPC ........... *F01D 5/323* (2013.01); *F01D 5/3007* (2013.01); *F01D 11/006* (2013.01);
(Continued)

(58) Field of Classification Search
CPC . F01D 5/225; F01D 5/02; F01D 5/141; F01D 5/3007; F01D 11/006;
(Continued)

(56) References Cited

U.S. PATENT DOCUMENTS 8,251,651 B2 * 8/2012 Propheter-Hinckley ..................... F01D 5/3015 415/200
11,131,203 B2 * 9/2021 Sippel .................. F01D 11/008
(Continued)

FOREIGN PATENT DOCUMENTS

EP  0441424 A1 * 8/1991 ........... F01D 5/3015
EP  2778347 A1 * 9/2014 ............... F01D 5/02
(Continued)

*Primary Examiner* — Courtney D Heinle
*Assistant Examiner* — Ryan C Clark
(74) *Attorney, Agent, or Firm* — Birch, Stewart, Kolasch & Birch, LLP

(57) ABSTRACT

A turbine rotor of a turbine engine of an aircraft, the rotor comprising a rotor disc provided at its periphery with a plurality of cavities for receiving the root of a blade. Each blade includes a circumferential coupling rib, a plurality of platforms, a main wall that is extended at its two ends by an upstream radial wall and by a downstream radial wall, the two longitudinal edges of each platform comprising a groove for receiving part of said coupling rib of one of the two blades between which this platform is assembled, and in that the height of each upstream radial wall is such that said (Continued)

wall extends radially inwards beyond the bottom of the cavity, until it is in front of the upstream face of the rotor disc.

12 Claims, 5 Drawing Sheets

(52) U.S. Cl.
CPC .... *F05D 2220/323* (2013.01); *F05D 2240/24* (2013.01); *F05D 2240/55* (2013.01)

(58) Field of Classification Search
CPC ............. F01D 11/008; F05D 2220/323; F05D 2240/55; F05D 2240/80; F05D 2240/20; F05D 2240/24
See application file for complete search history.

(56) References Cited

U.S. PATENT DOCUMENTS

| | | | | |
|---|---|---|---|---|
| 2007/0020102 A1* | 1/2007 | Beeck | ................... | F01D 5/3007 416/219 R |
| 2007/0189901 A1* | 8/2007 | Dundas | ................. | F01D 11/008 416/223 A |
| 2010/0172760 A1* | 7/2010 | Ammann | ............... | F01D 11/008 29/889 |
| 2012/0156045 A1* | 6/2012 | Ammann | ............... | F01D 11/008 29/889.7 |
| 2020/0018179 A1* | 1/2020 | Kling | .................... | F01D 11/008 |
| 2020/0072064 A1* | 3/2020 | Sippel | ................... | B23P 15/006 |

FOREIGN PATENT DOCUMENTS

| | | | | |
|---|---|---|---|---|
| EP | 3751103 A1 | * | 12/2020 | ............... F01D 5/02 |
| GB | 2401655 A | * | 11/2004 | ............. F01D 5/147 |

* cited by examiner

TURBINE ROTOR AND PLATFORM FOR SUCH A ROTOR

FIELD OF THE INVENTION

The invention lies in the field of aircraft turbine engines such as a turbojet or turboprop engine.

The present invention relates to a turbine rotor of a turbine engine, in particular of an aircraft, and particularly to a low-pressure turbine rotor comprising separate blades and platforms.

PRIOR ART

A turbine rotor comprises at least one rotor disc and a plurality of blades distributed over the periphery of this disc. Each blade comprises an airfoil (i.e. the aerodynamic part of the blade) which is extended by a blade root, and the rotor disc on the periphery thereof is provided with a plurality of slots each allowing the receiving of a blade root.

Mobile blades conventionally designed by lost wax casting comprise platforms which are directly connected at the base of the airfoil and extend circumferentially around the latter.

In a turbine engine, the hot air and gases leaving the combustion chamber pass through the blade assembly of the turbine rotor. The role of the platforms is to delimit radially and inwardly, the circulating gas stream passing through this turbine.

The placing of blades in ceramic matrix composite materials (known under the acronym «CMC») in position in turbines, and in particular in so-called «high-speed» low pressure turbines (i.e. they rotate at high speed) requires adaptations of shape and simplification of the woven airfoil core.

The preparing of a platform in one piece with the airfoil requires the use of a fabric having fibres perpendicular to the fibres of the airfoil profile, which raises production problems.

Blades are already known in the prior art in which the platform is separate from the blade. This allows solving of the aforementioned problem. However, it is ascertained that there are issues of sealing between the platforms and the rotor disc on which the peripheral blades are mounted.

DESCRIPTION OF THE INVENTION

It is therefore one objective of the invention to guarantee sealing between these platforms and the slots of the rotor disc receiving the blade roots.

A further objective of the invention is to guarantee easy assembling of the blades, platforms, and rotor disc.

For this purpose, the invention relates to a turbine rotor of an aircraft turbine engine, comprising a rotor disc and a plurality of blades distributed over the periphery of this disc, each blade comprising an airfoil and a blade root, this disc being provided on the periphery thereof with a plurality of slots to receive the blade roots.

Conforming to the invention, this rotor comprises a plurality of platforms, each one thereof being inserted between two consecutive blades of the rotor, each blade comprises a coupling rib which extends in a circumferential direction from the base of the airfoil, the downstream end of the blade root comprises a locking groove which opens radially outwards, each platform comprises a main wall that is extended at the two axial ends thereof by an upstream radial wall and by a downstream radial wall, the main wall of each platform comprises two longitudinal edges each of these longitudinal edges comprising a recess to receive a part of the coupling rib of one of the two blades between which this platform is assembled, the height of each upstream radial wall is such that it extends radially inwards beyond the bottom of the slot and as far as in front of the upstream surface of the rotor disc, the downstream radial wall comprises a shoulder which opens radially inwards, and said rotor comprises a sealing and axial retaining ring which cooperates with the locking groove of the blades and shoulder of the downstream radial wall to retain the blade root axially within the slot in which it is received.

By means of these characteristics of the invention, and in particular through the fact that all the radial walls extend in front of the slots and as far as in front of the upstream surface of the rotor disc, there is ensured sealing between these platforms and the slots of the rotor disc.

In addition, since the coupling rib of the blade is received in grooves arranged in the independent platform, there is some friction at this connection allowing vibratory damping to be provided between the two parts.

Preferably, the upstream radial wall comprises an upstream spoiler which extends axially or substantially axially. Also preferably, said upstream spoiler is positioned on the upstream radial wall so that it lies at the slot of the rotor disc.

These characteristics are also advantageous compared with the prior art in which the platform, and hence the upstream spoiler, are in one piece with the blade. In this case, the blade root must be positioned underneath the spoiler, in other words the blade root must be arranged radially further inwardly i.e. closer to the rotation axis of the rotor than the spoiler. This leads to positioning the blade root very far from the rotor airstream and hence very far from the airfoil. It follows that there is a major increase in the overall mass of the blade and difficulties in attachment and disc design.

By means of these characteristics of the invention, and in particular on account of the fact that the upstream spoiler is positioned on the platform which is independent of the blade, the spoiler can be positioned at the desired height whilst the blade root can be brought close to the airfoil. This contributes towards reducing the overall mass of the blade.

According to other advantageous nonlimiting characteristics of the invention, taken alone or in combination:
- said downstream radial wall comprises a downstream spoiler which extends axially or substantially axially;
- the airfoil comprises a lower surface and an upper surface, in that the coupling rib comprises a concave part on the lower surface of the airfoil and a convex part on the upper surface of the airfoil, the longitudinal edge of the wall is convex and comprises a convex recess which receives the concave part of the coupling rib, and the longitudinal edge of the wall is concave and comprises a concave recess which receives the convex part of the coupling rib;
- the upstream radial wall, on the downstream surface thereof, has a groove receiving a portion of an annular sealing ring arranged between this downstream surface and the upstream surface of the rotor disc;
- the main wall comprises a radially inner surface and at least one stiffener which projects radially or substantially radially inward from said radially inner surface, two consecutive slots of the rotor disc are separated by a tooth and in that the radially inner end of the stiffener is in contact with the radially outer surface of the tooth;

the blades and/or the platforms are formed of a ceramic matrix composite material.

The invention also concerns a platform for a turbine rotor of an aircraft turbine engine, which comprises a rotor disc and a plurality of blades distributed over the periphery of this disc, this rotor disc comprising an upstream surface, each blade comprising an airfoil and a blade root, this disc being provided on the periphery thereof with a plurality of slots to receive blade roots, and each blade comprising a coupling rib which extends in a circumferential direction from the base of the airfoil.

Conforming to the invention, this platform is intended to be inserted between two consecutive blades of said rotor, in that it comprises a main wall extended at the two axial ends thereof by an upstream radial wall and by a downstream radial wall, in that the main wall of the platform comprises two longitudinal edges, each of these longitudinal edges comprising a recess to receive a part of the coupling rib of one of the two consecutive blades between which this platform is intended to be inserted, in that the height of the upstream radial wall is such that when said platform is inserted between two consecutive blades of said rotor, said upstream radial wall extends radially inwards beyond the bottom of the slot and as far as in front of the upstream surface of the rotor disc, and in that the downstream radial wall comprises a shoulder which emerges radially inwards.

The invention also concerns a turbine for an aircraft turbine engine, which comprises at least one rotor such as aforementioned, the turbine preferably being a low-pressure turbine.

Finally, the invention concerns an aircraft turbine engine which comprises at least one turbine such as aforementioned.

DESCRIPTION OF THE FIGURES

Other characteristics, objectives and advantages of the invention will become apparent from the following description which is solely illustrative and nonlimiting and is to be read in connection with the appended drawings in which.

DETAILED DESCRIPTION OF THE INVENTION

Figure 1:
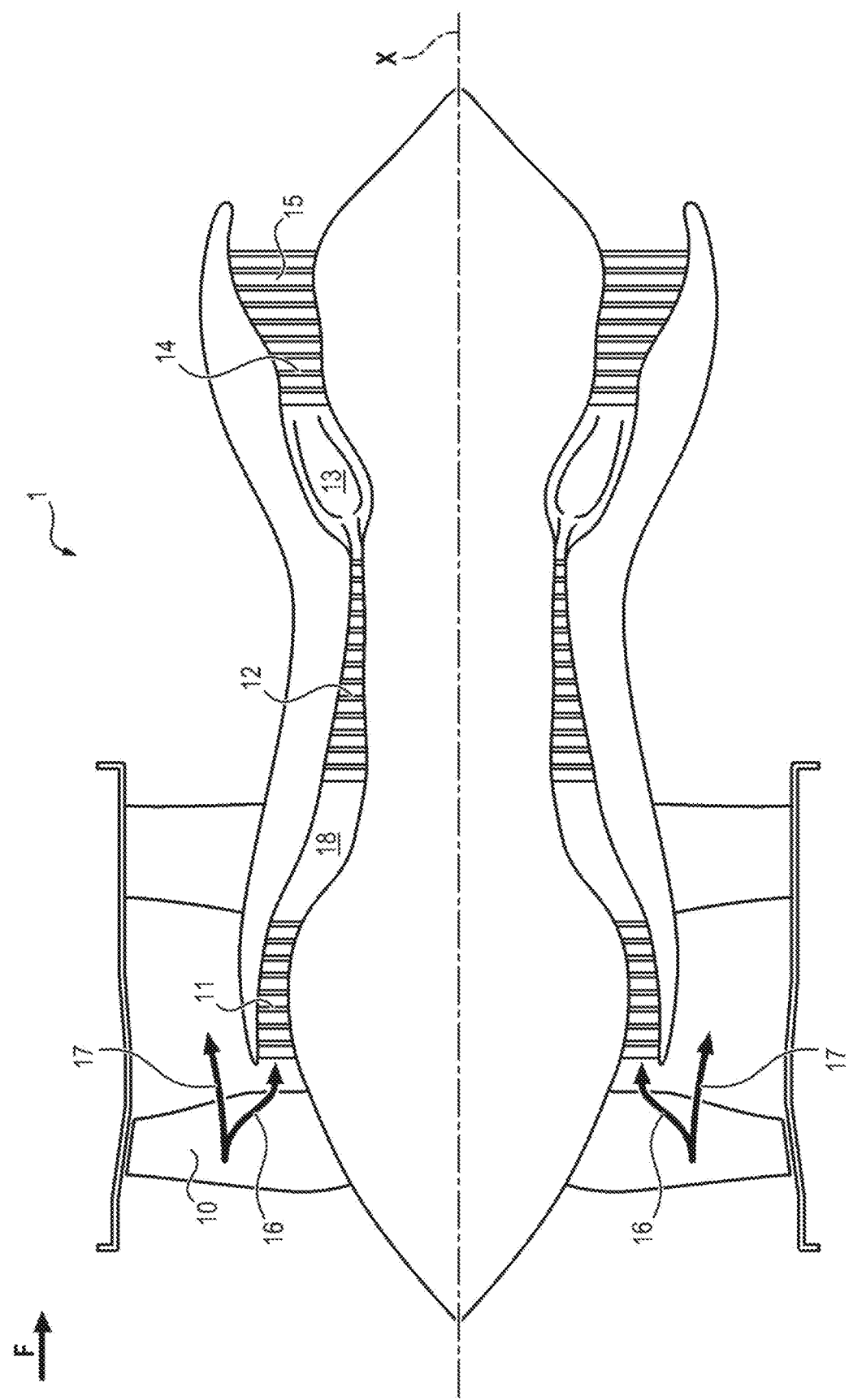
FIG. 1 is a schematic axial cross-sectional view of a turbine engine of the invention.

FIG. 1 shows an embodiment of a turbine engine conforming to the invention. Here it is a twin flow and twin spool turbine engine. However, it could be a turbine engine of another type, of single flow or single spool type, without however departing from the scope of the invention.

The turbine engine 1 has a longitudinal central axis X about which there extend different components. The turbine engine successively comprises, from upstream to downstream (upstream and downstream being defined in relation to the direction of flow F of gasses through this turbine engine): a fan 10, a low pressure compressor 11, a high pressure compressor 12, a combustion chamber 13, a high pressure turbine 14 and a low pressure turbine 15.

After passing through the fan 10, the air divides into a central primary flow 16 and secondary peripheral flow 17. This primary flow 16 flows in a main stream of circulating gases 18 successively passing through the compressors 11 and 12, the combustion chamber 13, and the turbines 14 et 15.

Each turbine comprises several successive stages each of which comprises nozzle guide vanes and a rotor 2.

Figure 7:
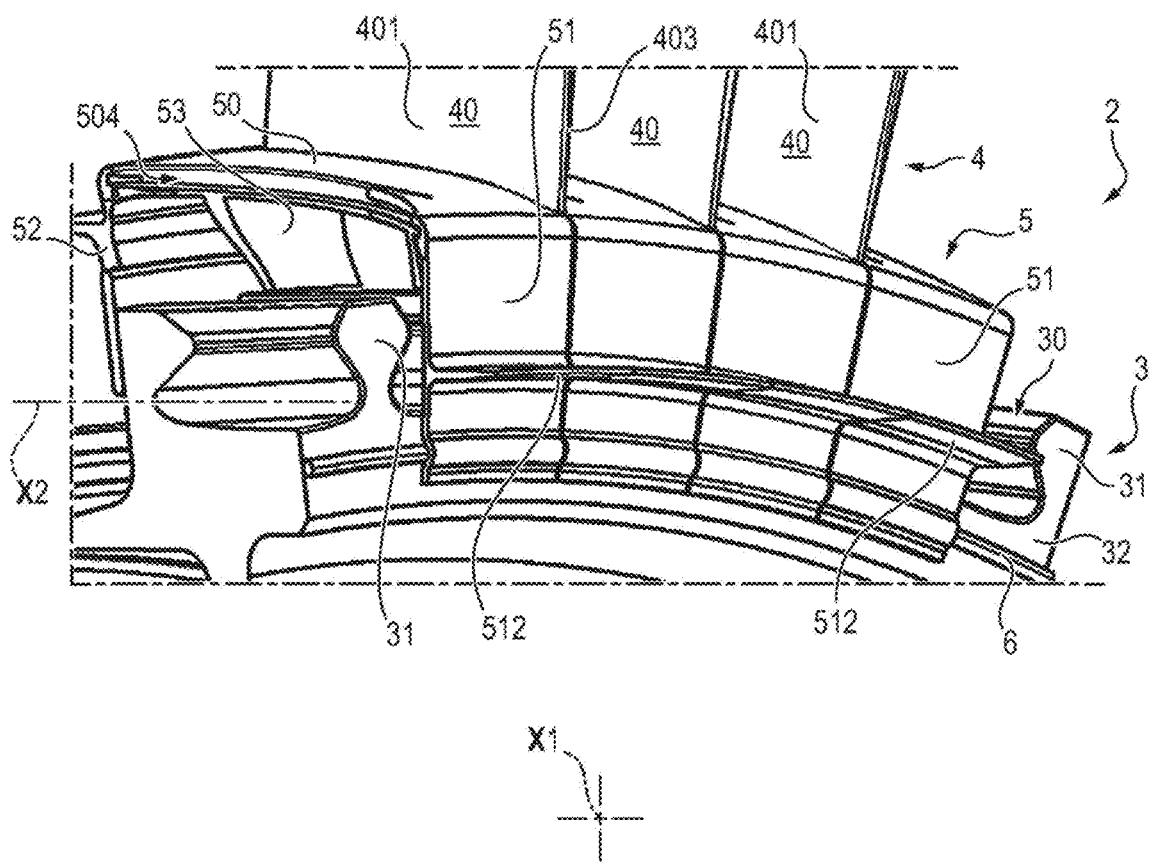
FIG. 7 is a perspective view of part of the rotor conforming to the invention, seen from the upstream side.
Figure 8:
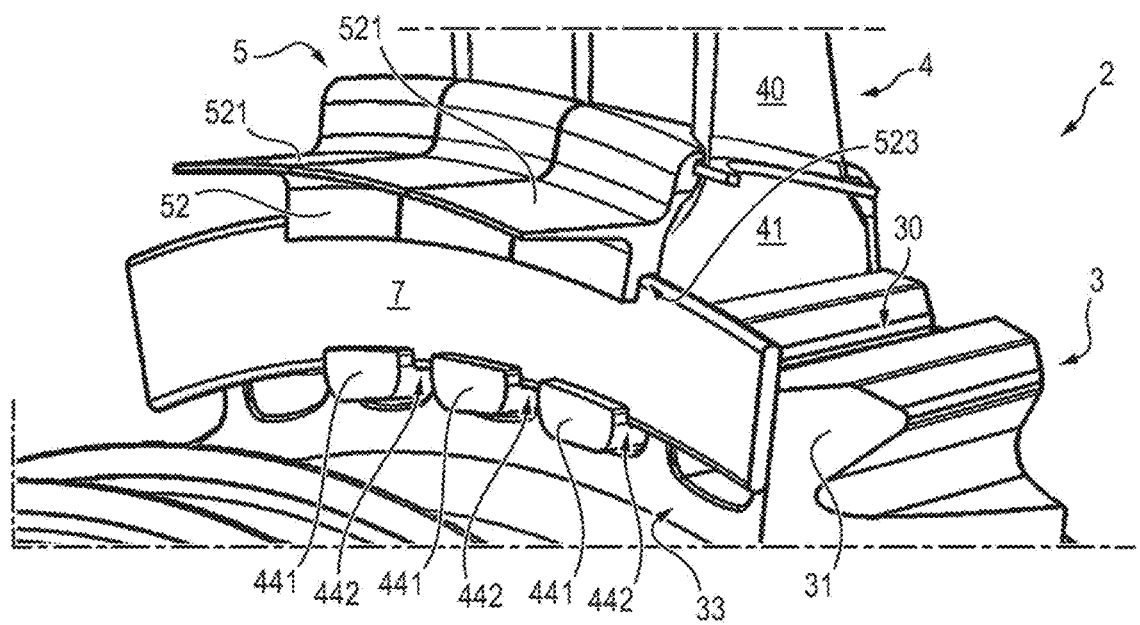
FIG. 8 is a perspective view of part of the rotor conforming to the invention, seen from the downstream side.
Figure 9:
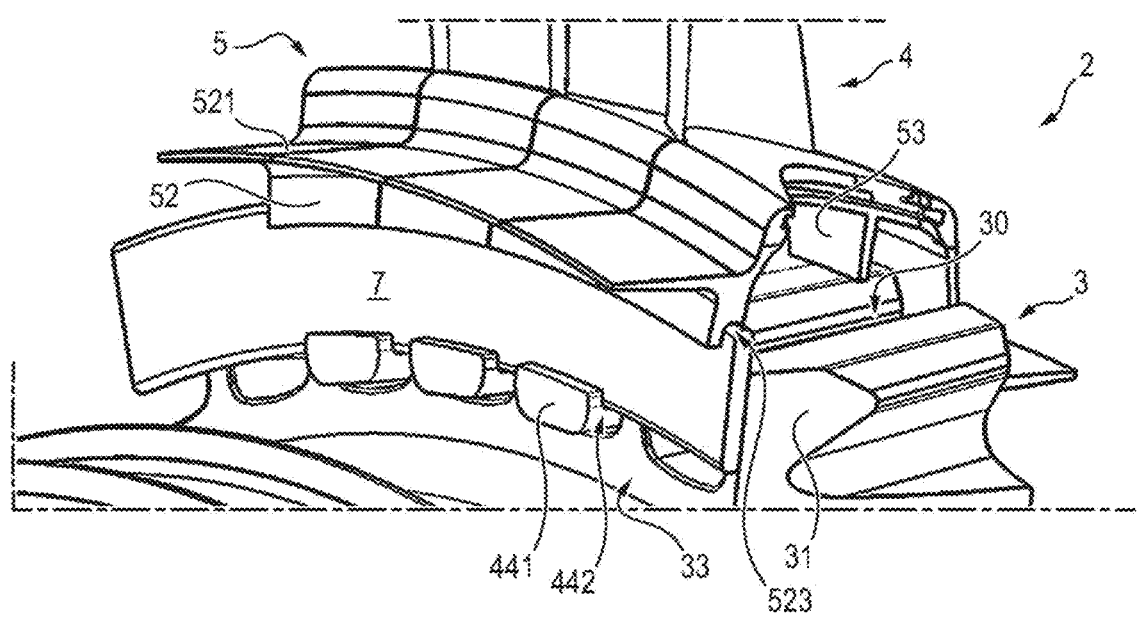
FIG. 9 is a similar view to the view in FIG. 8 in which an additional platform has been added.

With reference to FIGS. 7 to 9, it can be seen that this rotor 2 conforming to the invention comprises a rotor disc 3 and a plurality of blades 4 circumferentially distributed around this disc.

The rotor disc 3 has a central longitudinal axis X1, which also forms the axis of rotation thereof. When the rotor 2 is positioned in the turbine engine, this axis X1 is colinear with the longitudinal axis X of the turbine engine.

The rotor disc 3, on the entire circumference thereof, has a plurality of slots 30 and two successive slots 30 are separated by a tooth 31.

The rotor disc 3 also has an upstream surface 32 and downstream surface 33.

Each slot 30 preferably extends axially i.e. along a longitudinal axis X2, parallel to axis X1.

Each slot 30 is intended to receive the root of a blade 4 and for this purpose has a shape mating therewith. In the example illustrated in the Figures, each slot 30 has a cross-section of dovetail shape.

Figure 2:
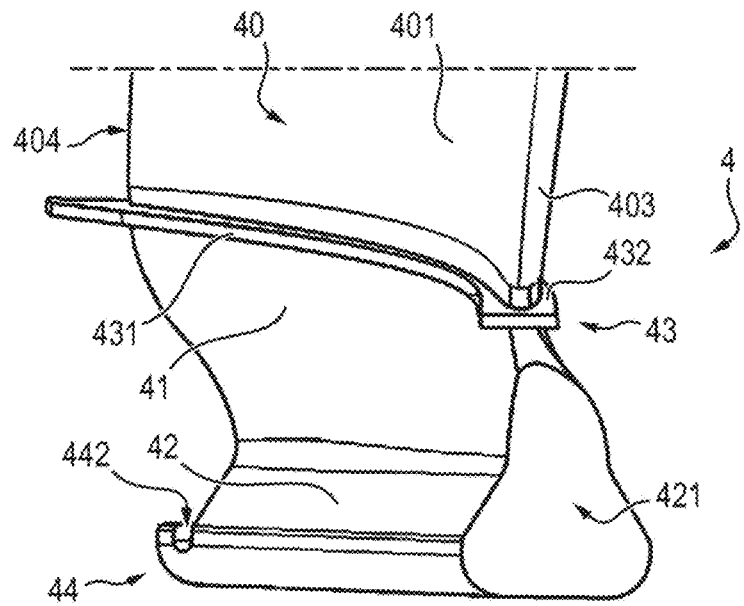
FIG. 2 is a perspective view of part of a blade conforming to the invention, seen from the upstream side.
Figure 3:
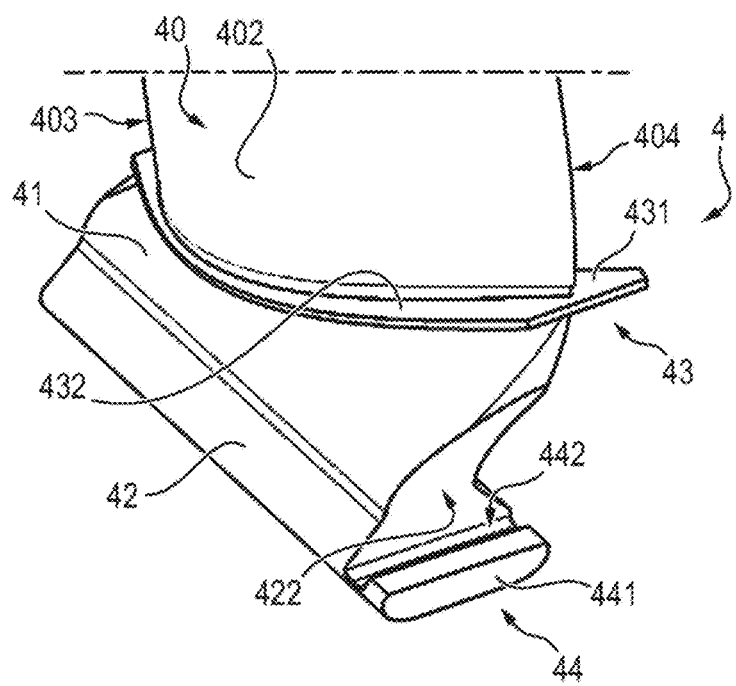
FIG. 3 is a perspective view of part of a blade conforming to the invention, seen from the downstream side.

The blade 4 is now described in more detail with reference to FIGS. 2 and 3.

Each blade 4 comprises an airfoil 40 which is extended by a shank 41 and then by a blade root 42. Each blade root 42 has a cross-section, here of dovetail shape, so that it can be axially inserted into a slot 30.

In addition, each blade root 42 has an upstream surface 421 and downstream surface 422.

The airfoil 40 has a lower surface 401, an upper surface 402, a leading edge 403 oriented toward the upstream side of the rotor, and a trailing edge 404.

The blade 4 also comprises a coupling rib 43 which extends circumferentially around the base of the airfoil 40. By «base of the airfoil», it is meant the portion of the airfoil located just next to the shank 41.

Preferably, the coupling rib 43 substantially follows the contour of the airfoil 40, and preferably also the rib 43 is perpendicular or substantially perpendicular to the profile of the airfoil, so that it comprises a concave portion 431 and convex portion 432 respectively on the lower surface 401 and upper surface 402 sides of the airfoil.

In the example of embodiment illustrated in the Figures, the parts 431 and 432 of the rib 43 join together towards upstream in the vicinity of the leading edge 403 of the airfoil 40 and also join together downstream in the vicinity of the trailing edge 404 of the airfoil, so that the coupling rib 43 extends over the entirety of the circumference of the airfoil 40. In a variant of embodiment not shown in the Figures, it is also possible that the parts 431 and 432 do not join together in the vicinity of the leading edge 403 and/or in the vicinity of the trailing edge 404 of the airfoil.

The blade 4 also comprises an axial locking device 44 of the blade root. 42 inside the slot. 30 of the rotor disc 3.

This axial locking device 44 comprises an axial lug 441 which extends axially from the lower part of the downstream face 422 of the blade root 42. The axial lug 441 comprises a locking groove 442 which opens radially outward (with reference to the position occupied by the blade 4 when it is arranged on the rotor disc 3). The groove 442 extends perpendicular to the axis of the blade root 42.

According to the invention, the rotor 2 also comprises a plurality of platforms 5, separate from the blades 4, and which are arranged around the rotor disc 3 so that each platform 5 is inserted between two consecutive blades 4 of the rotor disc.

Figure 4:
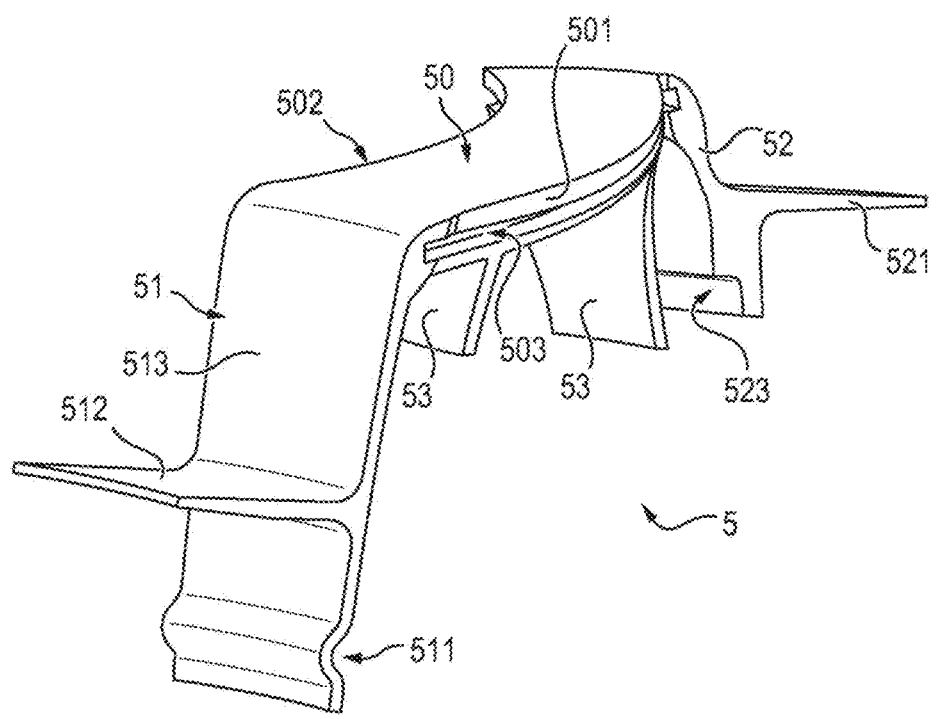
FIG. 4 is a perspective view of a platform conforming to the invention.
Figure 5:
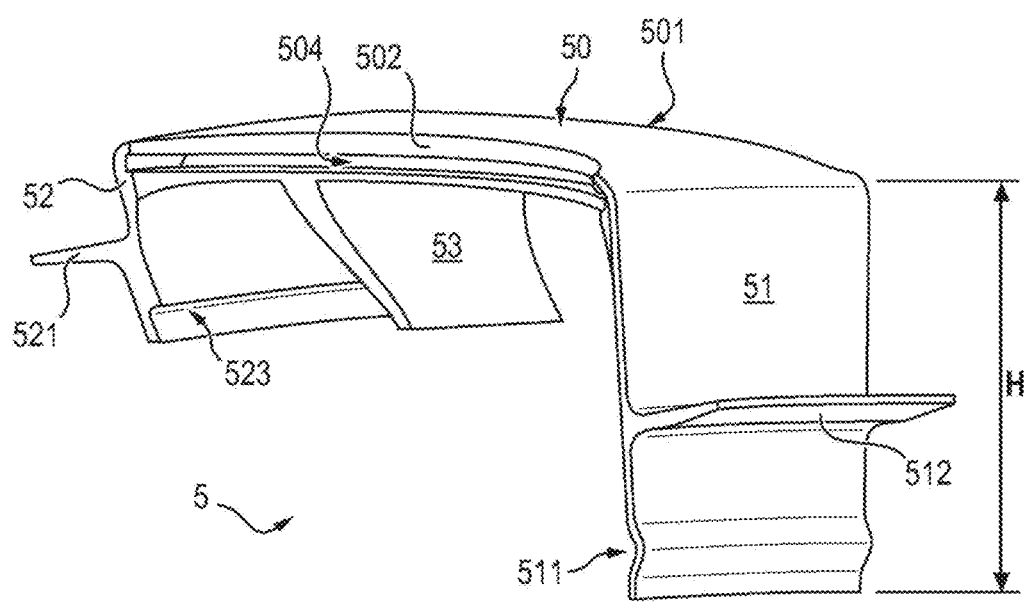
FIG. 5 is a perspective view of the platform in FIG. 4 from a different viewing angle.
Figure 6:
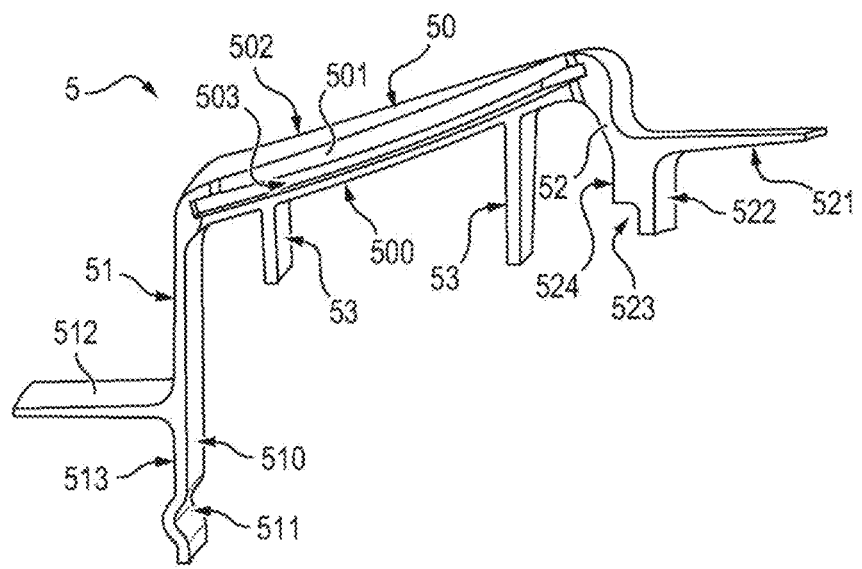
FIG. 6 is a side view of the platform in FIG. 4.

In FIGS. 4 to 6, an example of embodiment of said platform 5 can be seen.

The platform 5 comprises a main wall 50 which is extended at the two axial ends thereof by an upstream radial wall 51 and downstream radial wall 52 respectively. By «radial» wall, it is meant a wall that is radial or substantially radial when the platform 5 is its normal position of use i.e. inserted between two consecutive blades of the rotor.

Advantageously, and as can be seen in the Figures, the main wall 50 is sloped from bottom and upstream to the top and downstream. This gives a strong airstream slope typical of the first stage of a high-speed low pressure turbine. However, in other variants of embodiment, the wall 500 could be sloped in the other direction or extend axially (without sloping).

The main wall 50 comprises two longitudinal edges 501 and 502.

Preferably the longitudinal edge 501 is convex and the longitudinal edge 502 is concave. Also, the respective degrees of curvature of edges 501 and 502 are configured so that when a platform 5 is arranged between two consecutive blades, its edge 501 follows the contour of the lower surface 401 of one of these two blades, and its edge 502 follows the contour of the upper surface 402 of the other of these two blades, to ensure continuity of the main airstream 18.

In addition, the convex longitudinal edge 501 comprises a convex recess 503 to receive the concave part 431 of the coupling rib 43 of one of the two blades 4 between which the platform 5 is arranged, and the concave longitudinal edge 502 comprises a concave recess 504 to receive the convex part 432 of the coupling rib 43 of the other of the two blades 4 between which the platform 5 is arranged.

Also, the upstream radial wall 51 has sufficient height H (see FIG. 5) so that when the platform 5 is in position on the rotor disc 3, as illustrated in FIG. 7, this wall 51 extends in front of a left or right half of the upstream opening of the slot 30, and also radially inwards beyond the bottom of the slot 30 as far as in front of the upstream surface 32 of the rotor disc 3. This upstream radial wall 51 therefore takes part in achieving a seal at the slots 30.

Advantageously, and to further strengthen this seal, the upstream radial wall 51 on the downstream surface thereof 510 (i.e. the surface facing the rotor disc 3 when the platform 5 is in position) can have a groove 511 slightly in an arc of a circle and able to receive a portion of a sealing ring 6 lying flat against the upstream surface 32 of the disc 3.

Also, preferably, the upstream radial wall 51 is provided with an upstream spoiler 512 which extends axially or substantially axially toward upstream from the upstream surface 513 of the radial wall 51.

Also preferably, the downstream radial wall 52 is provided with a downstream spoiler 521 which extends axially or substantially axially toward downstream from the downstream surface 522 of the radial wall 52.

The fact that the platform 5 is independent of the blade 4 means that it is possible to position the upstream spoiler 512 lower down (i.e. closer to the axis X1) than the downstream spoiler 521, all the more so since the wall 50 is sloped, whilst not impacting the position of the blade root 42. It is therefore possible to maintain a shank 41 of low height.

The downstream radial wall 52 is also provided with a shoulder 523 arranged on the upstream surface 524 of the wall 52. This shoulder 523 emerges radially inwards.

Finally, advantageously, the main wall 50 of the platform 5 comprises at least one stiffener 53 projecting inwardly from its radially inner surface 500. In the example of embodiment illustrated in the Figures, the platform 5 comprises two stiffeners 53. It could comprise more than two.

Similarly, in the example of embodiment illustrated in the Figures, the stiffeners are perpendicular to the median longitudinal axis of the wall 50. This or these stiffeners could also be arranged along the median longitudinal axis of the wall 50 and be rectilinear or incurved to follow the radius of curvature of the edges 501 and 502.

The assembling of the different parts is advantageously carried out as follows:

All the blades 4 and platforms 5 are assembled together and then inserted in the rotor disc 3, from the upstream surface 32 thereof so that the blade roots 42 slide into the slots 30. It will be noted in this respect that the downstream radial wall 52 is of sufficiently low height to allow this sliding.

As can be seen in FIGS. 8 and 9, a sealing and axial retaining ring 7 which is planar and annular, is then inserted so that the radially inner edge thereof is inserted into the grooves 442 of the axial lugs 441 of the blades 4, and the radially outer edge thereof is inserted in the shoulders 523 of the platforms 5.

This sealing ring 7 can be provided with notches, not visible in the Figures, for mounting via clawing, or it can be composed of several annual portions assembled end to end.

Each blade 4 is therefore retained axially upstream by the upstream radial wall 51, which itself is axially retained on the rotor disc 3 (see FIG. 7) and axially retained downstream by the sealing ring 7.

The assembling of these different elements is therefore simple.

As can be better seen in FIGS. 7 and 9, when the platforms 5 are in position, the respective stiffeners thereof 53 rest against the top of the teeth 30 of the rotor disc, and the height of each of these stiffeners 53 is therefore adapted accordingly. This also ensures radial positioning of the platforms during engine shutdown phases.

Advantageously, the blades 4 and platforms 5 are formed of a ceramic matrix composite material (CMC) and, since they are separate, this allows easy orientation of the constituent fibres thereof and avoids having fibres lying at a right angle between the blades and platforms. However, the blades 4 and platforms 5 could also be in metal without departing from the scope of the invention.

The invention claimed is:

1. A turbine rotor of an aircraft turbine engine, comprising a rotor disc and a plurality of blades distributed over a periphery of the rotor disc, each blade comprising an airfoil and a blade root, the rotor disc being provided on the periphery thereof with a plurality of slots to receive the blade root of a blade of the plurality of blades, wherein the turbine rotor comprises a plurality of platforms, each one thereof being inserted between two consecutive blades of the plurality of blades of the rotor, wherein each blade comprises a coupling rib which extends in a circumferential direction from a base of the airfoil, wherein a downstream end of the blade root comprises a locking groove which opens radially outward, wherein each platform of the plurality of platforms comprises a main wall, which is extended at two axial ends thereof by an upstream radial wall and by a downstream radial wall, wherein the main wall of each platform comprises two longitudinal edges, each of the longitudinal edges comprising a recess to receive a part of the coupling rib of one of the two consecutive blades of the plurality of blades between which the platform is assembled, wherein a height of each upstream radial wall is such that the upstream radial wall extends radially inward beyond a bottom of the slot, as far as in front of an upstream surface of the rotor disc, wherein the downstream radial wall comprises a shoulder which emerges radially inward, and wherein the turbine rotor comprises a sealing and axial retaining ring which cooperates with the locking groove of the blades and the shoulder of the downstream radial wall, to retain the blade root axially within the slot in which the blade root is received.

2. The rotor according to claim 1, wherein the upstream radial wall comprises an upstream spoiler which extends axially.

3. The rotor according to claim 2, wherein the upstream spoiler is positioned on the upstream radial wall so that the upstream spoiler lies at the slot of the rotor disc.

4. The rotor according to claim 1, wherein the downstream radial wall comprises a downstream spoiler which extends axially.

5. The rotor according to claim 1, wherein the airfoil comprises a lower surface and an upper surface, wherein the coupling rib comprises a concave part on the lower surface of the airfoil and a convex part on the upper surface of the airfoil, wherein one of the two longitudinal edges of the wall is convex and comprises a convex recess to receive the concave part of the coupling rib, and wherein the other of the two longitudinal edges of the wall is concave and comprises a concave recess to receive the convex part of the coupling rib.

6. The rotor according to claim 1, wherein the upstream radial wall, on a downstream face thereof, comprises a groove to receive a portion of an annular sealing ring arranged between the downstream surface of the upstream radial wall and an upstream surface of the rotor disc.

7. The rotor according to claim 1, wherein the main wall comprises a radially inner surface and at least one stiffener which projects radially inward from the radially inner surface, wherein two consecutive slots of the rotor disc are separated by a tooth, and wherein a radially inner end of the stiffener is in contact with a radially outer surface of the tooth.

8. The rotor according to claim 1, wherein the blades and/or the platforms are formed of a ceramic matrix composite material.

9. A platform for a turbine rotor of an aircraft turbine engine, which comprises a rotor disc and a plurality of blades distributed over a periphery of the rotor disc, the rotor disc comprising an upstream surface, each blade comprising an airfoil and a blade root, the rotor disc being provided on the periphery thereof with a plurality of slots to receive the blade root of a blade of the plurality of blades, and each blade comprising a coupling rib which extends in a circumferential direction from a base of the airfoil, wherein the platform is intended to be inserted between two consecutive blades of the rotor, wherein the platform comprises a main wall which is extended at two axial ends thereof by an upstream radial wall and by a downstream radial wall, wherein the main wall of the platform comprises two longitudinal edges, each of the longitudinal edges comprising a recess to receive a part of the coupling rib of one of the two consecutive blades between which the platform is intended to be inserted, wherein a height of the upstream radial wall is such that when the platform is inserted between two consecutive blades of the plurality of blades of the rotor, the upstream radial wall extends radially inward beyond a bottom of the slot as far as in front of the upstream surface of the rotor disc, and wherein the downstream radial wall comprises a shoulder which emerges radially inward.

10. A turbine for an aircraft turbine engine, wherein the turbine comprises at least one turbine rotor according to claim 1.

11. An aircraft turbine engine comprising at least one turbine according to the preceding claim.

12. The turbine according to claim 10, being a low pressure turbine.

* * * * *